US007251224B2

(12) United States Patent
Ades et al.

(10) Patent No.: US 7,251,224 B2
(45) Date of Patent: Jul. 31, 2007

(54) COMMUNICATIONS MESHES

(75) Inventors: Stephen Ades, Over (GB); Philip T. Hughes, Longstanton (GB); Malcolm C. Taylor, Great Shelford (GB)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 09/971,622

(22) Filed: Oct. 9, 2001

(65) Prior Publication Data

US 2002/0044537 A1 Apr. 18, 2002

Related U.S. Application Data

(60) Provisional application No. 60/316,281, filed on Sep. 4, 2001, provisional application No. 60/306,435, filed on Jul. 20, 2001, provisional application No. 60/306,446, filed on Jul. 20, 2001, provisional application No. 60/238,784, filed on Oct. 10, 2000.

(51) Int. Cl.
*H04Q 7/00* (2006.01)
*H04J 3/00* (2006.01)
*H04J 4/00* (2006.01)

(52) U.S. Cl. .................. 370/330; 370/336; 370/345; 370/436

(58) Field of Classification Search ............. 370/328, 370/329, 330, 337, 347, 478, 479, 336, 345, 370/436
See application file for complete search history.

(56) References Cited

U.S. PATENT DOCUMENTS 5,197,125 A * 3/1993 Engel et al. ............ 370/458
5,428,603 A * 6/1995 Kivett .................... 370/280
5,502,723 A * 3/1996 Sanders .................. 370/352
5,722,070 A * 2/1998 Alford .................... 455/425
5,742,593 A * 4/1998 Sharony et al. ......... 370/330
5,920,571 A * 7/1999 Houck et al. ........... 370/458
5,960,002 A * 9/1999 Ramfelt et al. ......... 370/450
5,982,780 A * 11/1999 Bohm et al. ............. 370/450

(Continued)

OTHER PUBLICATIONS

Subramanian, Ramanathan, et al.: Scheduling Algorithms for Multihop Radio Networks, IEEE/ACM Transactions on Networking, Apr. 1993, vol. 1, No. 2, pp. 166-177.

(Continued)

*Primary Examiner*—Alpus H. Hsu
(74) *Attorney, Agent, or Firm*—Blakely, Sokoloff, Taylor & Zafman LLP

(57) ABSTRACT

A method is disclosed for assigning timeslot numbers to timeslots used for transmission and reception of signals between nodes in a network (1) of nodes (A–H). Each node (A–H) is able to communicate with at least one other node (A–H) by a transmission link (2) between said each node (A–H) and said at least one other node (A–H). At least some of the nodes (A–H) have a respective transmission link (2) to each of plural other nodes (A–H). Each transmission of a signal over a link (2) from a first node (A–H) to a second node (A–H) takes place during a timeslot. The method includes the steps of assigning timeslot numbers to each timeslot in sequence in ascending order of the number of available choices of timeslot number at each timeslot.

30 Claims, 3 Drawing Sheets

U.S. PATENT DOCUMENTS

| | | | |
|---|---|---|---|
| 6,094,425 A * | 7/2000 | Auger et al. | 370/330 |
| 6,331,973 B1 * | 12/2001 | Young et al. | 370/337 |
| 6,519,230 B1 * | 2/2003 | Murayama | 370/250 |
| 6,574,199 B1 * | 6/2003 | Young et al. | 370/254 |
| 6,600,754 B1 * | 7/2003 | Young et al. | 370/459 |
| 6,631,124 B1 * | 10/2003 | Koorapaty et al. | 370/337 |
| 6,693,915 B1 * | 2/2004 | Lappetelainen et al. | 370/468 |
| 6,791,994 B1 * | 9/2004 | Young et al. | 370/436 |
| 6,810,022 B1 * | 10/2004 | Young | 370/280 |
| 6,826,160 B1 * | 11/2004 | Wang et al. | 370/329 |

OTHER PUBLICATIONS

D. Youngs: Frequency Assignment for Cellular Radio Networks, Fifth IEE Conference on Telecommunications, Mar. 1995, pp. 179-183.

Zhu: A Five-Phase Reservation Protocol (FPRP) for Mobile Ad Hoc Networks:; 1998 IEEE XP10270275, pp. 322-331.

Application No.: 02 706 924.4-2416 Examination report dated May 25, 2007.

Application No.: 2003-514755 Office Action dated May 22, 2007.

* cited by examiner

COMMUNICATIONS MESHES

The present application claims priority to U.S. Provisional Applications of Stephen Ades, Ser. Nos. 60/238,784 filed Oct. 10, 2000, 60/306,446 filed Jul. 20, 2000, 60/306,435 filed Jul. 20, 2000, and 60/316,281 filed Sep. 4, 2201, the entirety of which are hereby incorporated into the present application by reference.

The present invention relates to a method of assigning timeslot numbers to timeslots and to related computer software and hardware.

In this specification, various headings and sub-headings have been used. It should be noted that the headings and sub-headings have been used merely for reasons of clarity and convenience and are not intended to have any legal effect.

BACKGROUND

In our International patent application WO-A-98/27694, the entire disclosure of which is incorporated herein by reference, there is disclosed a communications apparatus comprising a network in the form of a "mesh" of interconnected nodes. Each node in the mesh can communicate with plural other nodes via individual respective point-to-point radio links between nodes by means of substantially unidirectional (i.e. highly directional) radio transmissions along the links, i.e. signals are not broadcast but are instead directed to a particular node with signals being capable of being passed in both directions along the link. The frequency used may be for example at least about 1 GHz. A frequency greater than 2.4 GHz or 4 GHz may be used. Indeed, a frequency of 40 GHz, 60 GHz or even 200 GHz may be used. Beyond radio frequencies, other yet higher frequencies such as of the order of 100,000 GHz (infra-red) could be used. In the preferred embodiment, each node in the mesh has plural antennas which provide plural potential point-to-point transmission links to other nodes. For example, each node may have four or eight antennas each respectively providing a link to another node. (It will be understood that in this context, "antenna" is to be construed broadly and includes any arrangement that can send or receive a highly directional beam. The plural antennas may for example be provided by plural physically discrete antennas that are individually selectable, by one or more physically steerable antennas, or by a phased array antenna.) In an example, time division duplex (TDD) is used to alternate transmission and reception at the nodes by dividing transmission and reception time frames into discrete timeslots.

The primary advantages of this "mesh" approach are set out in WO-A-98/27694 and include the distribution of bandwidth across the mesh and its associated capacity advantages over alternative systems (such as point-to-multipoint or broadcast systems); the availability of diverse traffic paths to at least the majority of nodes, which potentially allows service to be maintained regardless of whether or not a particular node has failed, thereby giving high resilience; and the potential to supply different nodes with widely varying levels of data traffic without the need for more than one type of radio link, simply by using a variable number of data paths to carry the data traffic. A wireless system has obvious advantages over a wired system in that it is not necessary to dig up roads, etc. to lay and maintain cables.

At least some and more preferably most nodes in the fully established mesh of interconnected nodes will be associated with a subscriber, which may be a natural person or an organisation such as a company, university, etc. Each subscriber node will typically act as the end point of a link dedicated to that subscriber (i.e. as a source and as a sink of data traffic) and also as an integral part of the distribution network for carrying data intended for other nodes. However, an operator of the mesh network may initially deploy a set of "seed" nodes in a "seed network". A seed node will typically be a non-subscriber node (though it may later be converted into a subscriber node) that is placed by the network operator prior to offering network services to potential subscribers and will typically be deployed to be highly visible to a large number of potential subscribers. (The word "visible" and the phrase "line-of-sight" or similar will be used herein in the sense that when two nodes or sites are said to be "visible" to each other or to be in "line-of-sight" with each other, the nodes or nodes positioned at the sites can in principle communicate with each other wirelessly at the frequency or frequencies used in the network when suitable transmitting and receiving equipment is installed at the site.) In the seed network, each node is visible to at least one other node. The seed network allows a suitable, minimum number of subscriber nodes to be connected to the mesh directly via these seed nodes when network services are offered by the operator. The seed nodes will typically act only as transit nodes and not as either sources or sinks of network traffic (whether for example user traffic or network management traffic). A seed node may in due course be associated with a subscriber and therefore become a subscriber node.

Once there has been established a suitable seed network or other set of nodes in which each node is in principle visible to at least one other node, it is necessary to select from all possible lines-of-sight between the nodes (i.e. potential wireless transmission links between the nodes) those which are most suitable for use as actual wireless transmission links between the nodes. This process will be referred to herein by the phrase "formation of a mesh" or similar.

The term "mesh adaptation" or similar is used herein to refer generally to the process required to alter one mesh configuration to another mesh configuration in this manner.

Reference is made to U.S. Ser. No. 60/238,784 filed Oct. 10, 2000, U.S. Ser. No. 60/306,446 filed on Jul. 20, 2001, and U.S. Ser. No. 09/971,655 (US 2002/0042274 A1) of even date herewith, each of which is assigned to the assignee of the present application and the entire disclosure of each of which is incorporated herein by reference, and in which there are disclosed various concepts relating to communications meshes. In these patent applications, there is disclosed inter alia a method of formation of a mesh in which a set of connections are calculated. These connections may be over radio links as described above, cabled links or a combination of both types. It should be noted that in general, for any mesh network, there will exist some method of forming the mesh.

Coloring

"Colouring" is a term used herein to refer to the process of assigning timeslot numbers to each timeslot on a link in the mesh. This term is used herein because of the analogies that can be made with graph theory. It will be recalled that in the preferred implementation of the mesh, time is divided into discrete timeslots that are numbered within a time frame. For example, a wireless transmission on one wireless transmission link from a first node to another node may take place during timeslot 1; a wireless transmission on another wireless transmission link from that first node to a different other node may take place during subsequent timeslot 2;

reception of a wireless transmission at the first node from another node may take place during timeslot 3; and so on. In what follows, the term "colours" is used to refer to these timeslot numbers such that different timeslots in a time frame are notionally associated with a different "colour". Given that at any particular node it is desired to avoid having reception from or transmission to other nodes taking place during the same timeslot numbers (i.e. it is preferred that any particular node is only either transmitting to or receiving from one other node only at any time instant), each link to and from the node in this embodiment must have a different timeslot number or "colour". (This assumes that all transmissions and receptions take place at the same carrier frequency. A discussion of the more general case, in which different frequency channels may be used, is given below.) Thus, the problem of allocating timeslots to the links on the nodes is analogous to the known problem of colouring of a graph in graph theory.

According to a first aspect of the present invention, there is provided a method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

assigning timeslot numbers to each timeslot in sequence in ascending order of the number of available choices of timeslot number at each timeslot.

According to a second aspect of the present invention, there is provided a method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

(a) identifying the node which has the greatest total number of timeslots to be used for transmission or reception of signals;
(b) for the node identified in step (a), assigning a different timeslot number to each of said timeslots at that node;
(c) determining which of the timeslots that have not yet been assigned a timeslot number has the least available choices of timeslot number and assigning a timeslot number to that timeslot so determined; and,
(d) repeating step (c) until all timeslots have been assigned a timeslot number.

In step (a) of this aspect, if there are plural nodes having the same total number of timeslots to be used for transmission or reception of signals, then any of those nodes may be selected.

In step (b) of this aspect, the timeslot numbers may be assigned arbitrarily.

According to another aspect of the present invention, there is provided a method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

(a) for each timeslot, setting a variable to have a value that is equal to twice the maximum number of timeslots numbers available;
(b) identifying the node which has the greatest total number of timeslots to be used for transmission or reception of signals;
(c) for the node identified in step (b), assigning a different timeslot number to each of said timeslots at that node;
(d) for each other timeslot sharing a node with the timeslots to which timeslots were assigned in step (c), reducing the value of the variable by a constant for each instance of said sharing of a node;
(e) selecting the timeslot having the smallest value of the variable;
(f) for each other timeslot sharing a node with the timeslot selected in step (e), reducing the value of the variable by a constant for each instance of said sharing of a node;
(g) repeating steps (e) and (f) until all timeslots have been selected; and,
(h) in order of the selection made in steps (e) to (g), assigning a timeslot number to each of the timeslots selected in steps (e) to (g).

In step (b) of this aspect, if there are plural nodes having the same total number of timeslots to be used for transmission or reception of signals, then any of those nodes may be selected.

In step (c) of this aspect, the timeslot numbers may be assigned arbitrarily.

In any of these aspects, the timeslot number that is assigned to a timeslot is preferably the first timeslot number which is free at the nodes at both ends of the timeslot.

A timeslot number may be determined to be available taking into account interference that might arise in use on one link as a result of transmission on another link.

When assigning a timeslot number to a timeslot, an attempt to reduce interference effects can be made for example by (i) choosing the least-used timeslot number or (ii) choosing the most-used timeslot number or (iii) choosing the timeslot number which reduces the options for the smallest number of timeslots yet to be assigned timeslot numbers.

The method may comprise the step of assigning a frequency channel to each timeslot at which wireless transmission takes place during the timeslot. This can also be used as a way of reducing inter-node interference. The frequency that is assigned may for example be the frequency that has been least used or the frequency that has been most used.

The frequency channel assigned to the or each timeslot on at least one link may be selected taking into account interference that might in use be caused to or arise from a transmission/reception device that is not a part of said network of nodes during transmission over said at least one link. Thus, the interference effects which might otherwise arise both to and from another ("alien") transmission/reception device can be accounted for before the mesh network is operated, thereby to prevent such interference occurring.

The available frequency channels are preferably ordered in descending order of the number of links from one node to another node for which interference to or from a transmission/reception device that is not a part of said network of nodes during transmissions would be unacceptable, and wherein the frequency channel assigned to the or each timeslot on said at least one link is the first acceptable frequency channel in said order.

The determination of whether or not a frequency channel is acceptable preferably takes into account interference that might in use be caused to or arise from a transmission/reception device that is not a part of said network of nodes during transmissions at the frequency channel.

On at least one link, at least two consecutive timeslots may be allocated for transmission such that user traffic is in use transmitted continuously over more than one timeslot on said at least one link. A timeslot number is preferably assigned to said at least one link before timeslot numbers are assigned to any link not having two consecutive timeslots allocated for transmission.

All timeslots preferably have the same duration.

According to another aspect of the present invention there is provided a computer program comprising program instructions for causing a computer to perform the method as described above.

According to yet another aspect of the present invention, there is provided a storage medium having stored thereon or therein a computer program as described above.

The storage medium may be a computer memory. The storage medium may be a read-only storage medium. Suitable read-only storage media include a CD-ROM or a semiconductor ROM. The storage medium may be a rewritable storage medium. Suitable rewritable storage media include a hard or floppy magnetic disk and a rewritable CD.

According to a yet further aspect of the present invention, there is provided a computer programmed to carry out the method as described above.

It will be understood that the term "computer" is to be construed broadly. The term "a computer" may include several distributed discrete computing devices or components thereof.

Embodiments of the present invention will now be described by way of example with reference to the accompanying drawings, in which.

It will be understood that the methods described herein will typically be carried out by appropriate software running on appropriate computer equipment and will typically use variables and variable labels or flags as is known generally in the computer art. Computer-based databases and/or appropriate data structures will typically be used to store and organise the data.

I. Mesh Networks

Figure 1:
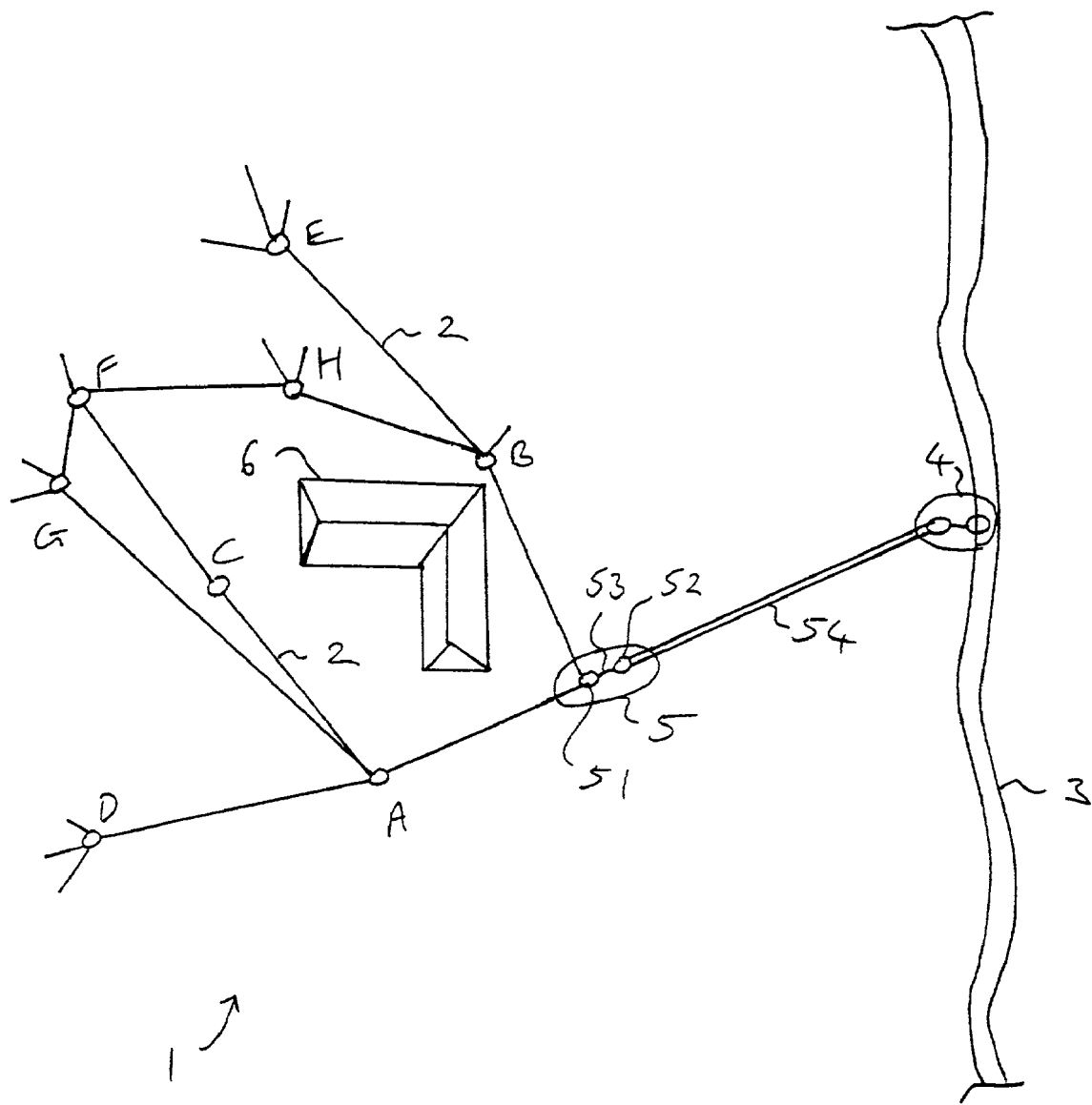
FIG. 1 shows schematically an example of a network provided by a mesh of interconnected nodes and which is connected to a trunk.

Referring first to FIG. 1 of the drawings, a communications network 1 has plural nodes A–H (only eight being shown in FIG. 1) which are logically connected to each other by respective point-to-point data transmission links 2 between pairs of nodes A–H in order to provide a mesh of interconnected nodes. The links 2 between the nodes A–H are provided by substantially unidirectional (i.e. highly directional) radio transmissions, i.e. signals are not broadcast but are instead directed to a particular node, with signals being capable of being passed in both directions along the link 2. The transmission frequency will typically be at least 1 GHz. Each node A–H has plural antennas which provide for the potential point-to-point transmission links to other nodes. In a typical example, each node A–H has four antennas and so can be connected to up to four or more other nodes.

In the example shown schematically in FIG. 1, the mesh 1 of interconnected nodes A–H is connected to a trunk 3. The point at which data traffic passes from the trunk 3 is referred to herein as a trunk network connection point ("TNCP") 4. As mentioned above, it will be understood that this term is to be construed broadly as a connection point to any external network and is not limited to connection to a conventional trunk network. The connection between the TNCP 4 and the mesh network 1 will typically be via a mesh insertion point ("MIP") 5. The MIP 5 will typically consist of a standard node 51 which has the same physical construction as the nodes A–H of the mesh network 1 and which is connected to a specially adapted node 52 via a feeder link 53. The specially adapted node 52 provides for a high data transfer rate connection via suitable (radio) links 54 to the TNCP 4 which, in turn, has suitable equipment for transmitting and receiving at these high data transfer rates. In one example, there will be one MIP 5 and one TNCP 4. In other examples, there will be at least two MIPs 5 and two TNCPs 4 and there is likely to be several MIPs 5 providing several connections to the trunk 3 (or to plural trunks) via respective TNCPs 4. The or each TNCP 4 may be connected to more than one MIP 5.

Typically, the location of the TNCPs 4 will be strongly determined by the route followed by the cables which form the existing trunk 3. The position of the MIPs 5 will typically be chosen by an operator of the mesh network 1 taking into account a number of factors including the location of available TNCPs 4 and the location of the nodes A–H of the mesh network 1. As mentioned above, the operator of the mesh network 1 may initially deploy a set of strategic or "seed" nodes in order to establish a seed network prior to offering network services to potential subscribers in order to ensure that a large number of potential subscribers can be connected to the mesh network 1 immediately on demand. It will be appreciated that the position and location of the nodes A–H (whether subscriber nodes or seed nodes) is strongly determined by the availability of suitable sites for positioning the equipment. Subscriber nodes will normally be positioned on or in close proximity to the relevant subscriber's building.

Once the physical location and position of the nodes A–H has been established, as will be understood and as can be seen from FIG. 1, the lines-of-sight between the nodes A–H can be determined. In other words, it can be determined which nodes are "visible" to which other nodes (in the sense described above, i.e. two nodes which are "visible" to or in "line-of-sight" with each other can communicate with each other wirelessly at the frequency or frequencies used in the mesh network 1). The determination of which nodes are actually visible to each other can be made in a number of ways, for example by actual physical inspections and testing at the relevant node sites or by use of appropriate surveys or a combination of both. It will be found in practice that some nodes are not visible to each other. For example, in FIG. 1, whilst node A is visible to each of nodes C, D, F and G, node A is not visible to nodes B, E or H because a tall building 6 obscures transmissions between nodes A and B and between nodes A and E and between nodes A and H. In addition, the question of which nodes are visible to which other nodes varies over time as buildings are erected or demolished, as trees grow or are felled, etc.

II. "Coloring"

II.1. Introduction

The preferred formation method as described in our U.S. patent application No. 60/238,784, U.S. patent application No. 60/306,446 and U.S. patent application Ser. No. 09/971,655 (US 2002/0042274 A1) is capable of being applied to meshes using a variety of different radio transmission techniques. As noted above, these include the class of meshes in which all transmissions on radio links are carried out in repeated time frames of discrete timeslots, for example a mesh that operates in a Time Division Duplex (TDD) mode. There are a variety of ways of operating a mesh in TDD mode. In one preferred mode of operation, in each discrete timeslot each node can transmit to one other node, receive from one other node or be inactive. Each discrete timeslot will be assigned a timeslot number, for the purposes of the following discussion. If there are num TimeSlots discrete timeslots, they are numbered from 1 to num TimeSlots.

The preferred formation process produces meshes appropriate for such TDD operation, since it ensures that enough timeslots are allocated on each link to carry the allocated traffic for the link, while at the same time it ensures that the total number of timeslots allocated for all the links at any one node is no more than the number of timeslots in a TDD frame.

In the case where a mesh operates in a TDD mode, an additional process is preferably carried out after the formation process and before the mesh network is deployed, in which a timeslot number is allocated for each of the timeslots required on each radio link in the mesh. As has been briefly discussed above and as will become apparent from the following, this process can be likened to a mathematical problem well known within the area of graph theory, which is known as the colouring problem and is thus referred to herein as "colouring" a mesh or similar: different timeslots in a time frame are notionally associated with a different "colour". For a mesh, there are however some additional goals that this process should preferably achieve that are not present in the standard colouring problem within graph theory. These goals relate to the practical aspects of operation of a radio communications mesh.

In this analogy, the standard colouring problem concerns only the assignment of timeslots to links such that each node requires each numbered timeslot to be active for use on at most one radio link. In other words, given that at any particular node it is desired to avoid having reception from or transmission to other nodes taking place during the same timeslot numbers (i.e. it is preferred that any particular node is only either transmitting to or receiving from one other node only at any time instant), each timeslot used for transmission to and from the node in this embodiment must have a different timeslot number or "colour". (This assumes that all transmissions and receptions take place at the same carrier frequency.) Preferably the process used for a mesh should also take account of one or more of the following additional factors.

Whenever a timeslot is used for transmission on any one link by a node, then all other nodes at which that same timeslot is used for reception may receive some interference from this transmitting node. If the transmitting node is located far enough from another node, this other node may also receive some interference in following timeslots, according to the distance between the nodes and the temporal length of the timeslots in question. The use of highly directional antennas in the mesh reduces the effects of this interference, but the colouring process preferably produces a set of timeslot allocations which permits each link to operate such that the strength of the desired signal received in each reception timeslot is greater by an adequate margin than the strength of the total interference received in that timeslot.

In order to produce a set of mesh links which will operate compatibly, the colouring process preferably produces a set of power levels at which each timeslot on each link should operate.

Dependent on the operating frequency of the radio links, the attenuation on those links may be affected by changing weather conditions. In some weather patterns, such as a moving heavy rain front, the various signal or interference paths within the mesh may be affected by the weather conditions in different ways at the same time. The set of power levels produced by the colouring process preferably produces a set of link configurations which are able for a high proportion of the time to operate compatibly, taking into account such weather conditions.

Typically a mesh network may be assigned multiple frequency channels on which to operate; preferably the nodes can use any one such channel during each timeslot. The level of interference between a transmitter on one link and a receiver on another will be reduced where they operate on different frequencies; the colouring process preferably exploits this fact in a multi-channel mesh to achieve a satisfactory colouring in cases where such a colouring could not be achieved in a mesh operating on fewer channels.

Where nodes are equipped with plural discrete antennas, these antennas may be operated using a single radio transmitter and a single radio receiver, for reasons of cost. In such a case, in practice each desired transmission out of an intended antenna may be accompanied by a (usually lower power) transmission on all other antennas, while each signal received on a desired antenna may be accompanied by additional interference effects from the other antennas. Preferably the levels of transmission and reception on the other antennas are very much weaker than those via the desired antenna. The colouring process preferably accommodates this additional interference and preferably does so not only when all antennas are static and in defined positions but also when any antenna other than the desired antenna is either moving or at a random orientation. This ensures that the mesh continues to operate correctly during antenna movements, such as may occur during an adaptation sequence.

II.2. Example Colouring Method

The preferred method to colour a mesh, taking into account these additional factors, is as follows. The method is based on the theorems of König (1916) and Vizing (1964) and on public domain algorithms based on these theorems. The public domain algorithms as applied in the present context will be outlined here, then the preferred or optional additional steps added to account for certain mesh-specific factors will be described. For the purposes of these algorithms:

each mesh node is regarded as a vertex of a graph;

each timeslot required for transmission from node N1 to node N2 is regarded as an edge. The direction of transmission on an edge is significant for the purposes of interference calculations;

the number of edges meeting at a vertex is the total number of timeslots to be used for either transmission or reception at the node which is that vertex;

an edge is "coloured" by assigning a timeslot number to it.

In the case of the mesh, the preferred colouring process also includes assigning a frequency channel and appropriate power levels to the edge.

If edges with the smallest number of available choices are coloured first, then the chance of finding a successful colouring is greatest (though this cannot be guaranteed). Accordingly, the following steps may be carried out:

C1) all the vertices are scanned to find a vertex with the maximum number of edges;

C2) these edges are coloured arbitrarily. Each colouring of an edge reduces the number of colours available at each of its end vertices by one;

C3) for each edge, a variable db1MaxChoice is initially set to twice the number of colours available, representing the sum of the colours available at each of its end vertices;

C4) for every edge sharing an end vertex with the edges just coloured, reduce the value of db1MaxChoice by 1 for each instance of sharing;

C5) select one of the edges with the smallest value of db1MaxChoice, and place this at position 1 in the list of edges to be coloured;

C6) reduce db1MaxChoice for every other edge by 1 for every vertex it shares with this edge;

C7) repeat the preceding two steps, every time placing one of the edges with smallest db1MaxChoice at the next highest position in the list. Continue until the list is fully ordered;

C8) assign the next edge to be coloured the first colour which is free at both end vertices;

C9) if no colour is free at both ends, then remove the previous colour assignment (this is termed "backtracking") and consider the next colour which was free at both end vertices of that edge;

C10) repeat the preceding two steps until either the process has backtracked to the first edge to be coloured and there are no more colours to try, or all of the edges have been coloured.

This procedure has the capacity to explore every possible colouring before giving up, but will in general backtrack a lot more times than is optimal, so that the time taken in colouring may be excessive. This is because the procedure will often find that no common colour is free at both vertices at step C8.

To reduce the amount of backtracking in such a case, the following method, which corresponds to the method published by König with his theorem, may be used. This handles the case where a timeslot is free at each end of an edge, but is a different timeslot at each vertex. This method attempts to reassign existing timeslot allocations until a common timeslot becomes available. Therefore, instead of backtracking when there is no common colour free at both ends of an edge, König's method may be attempted at step C8. If this fails, then the algorithm may backtrack.

In the basic algorithm steps described above, there was a once-only ordering of edges, carried out in steps C1 to C7. An alternative preferred implementation reorders every time an edge is coloured. Instead of maintaining a db1MaxChoice variable as previously described, at each colouring step a determination is made of how many colours are actually available for each edge and the edge having the least available colours is coloured next. This additional processing may save a greater amount of processing, avoided by reducing the quantity of back-tracking or reassignments by König's method. Because of the need to consider interference effects during each colour reassignment, König's reassignment method is less effective in the case of a mesh than in the standard graph colouring problem (for which it was of course designed).

II.3. Accommodating Intra-Mesh Interference

In order to obtain colourings that accommodate interference constraints arising from interference occurring between nodes of the mesh, two matrices are preferably used. The first is an interference matrix Inter[ ][ ] where Inter[i][j] indicates the degree to which edge [i] introduces interference to edge [j] in the case where both edges are coloured with the same frequency channel. Note that this matrix is not (in general) symmetrical: Inter[i][j] is not (in general) equal to Inter[j][i]. In order to set up Inter[ ][ ], a method of choosing signal levels for each edge must first be carried out.

Preferably, for each edge the signal power at the receiving end of the edge is chosen as the minimum level required to decode the signal at the receiver. This is generally determined by reference to the power level of noise in the receiving equipment, generally termed its "noise floor". The signal power level required will be a multiple of the noise floor. This multiple is generally termed the "demodulation margin". It may be different on different edges, for example as a function of the radio modulation being applied to the edge.

Such an approach to setting the received power levels generally acts to minimise the overall transmitted energy in the mesh and allows links to be operated at their maximum possible lengths. However, the dynamic range of the transmitter may be limited such that on some short links the minimum possible signal power at the receiver is greater than required to exceed the noise floor by the demodulation margin.

Preferably all radio links are operated such that the received power level for each edge is kept constant. As weather and other conditions vary, this requires the transmitted power for each edge to be adjusted, to compensate for varying levels of power loss along the link. Preferably this is achieved by a technique of feedback on each link, whereby the receiving end of the link indicates to the transmitting end how much the transmitting end should increase or decrease its transmitted power level in order to restore the received power level to its desired level.

For each edge, a maximum transmit power is preferably chosen, such that the link is able to operate at some maximum level of adverse weather and other conditions. If the feedback from the receiver indicates that more power is required than this maximum, then the transmit power is held at this maximum. For example, in a particular location it may be known that a certain level of rainfall is exceeded on average for 0.01% of the time; a maximum transmit power that permitted the link to operate at this level of rainfall would be required in order to allow the link to function for the remaining 99.99% of the time. Preferably, the maximum transmit power is increased to allow for any power setting or measurement tolerances or errors in the radio system, within both receiver and transmitter, thus ensuring that operation for such a percentage of the time can in practice be achieved.

Given the set of received power levels and demodulation margins, a matrix Allowed[j] can be constructed to represent the maximum level of interference allowable at the receiving end of an edge, this being an interference level which lies below the received signal power by the demodulation margin plus any allowances required for tolerances or errors of the type described above.

Having determined the maximum transmit power for each edge, Inter[i][j] can now be set up. Since in the preferred embodiment of the mesh both edges i and j correspond to pairs of directional antennas aligned along each of the edges, the interference from edge i onto edge j will in general be reduced according to the extent that the antennas are aligned away from the interference path. The interference will also depend on the weather and other conditions.

In one preferred implementation, the interference level is calculated according to the weather conditions that will produce the maximum interference to edge j, but based on the signal level calculated for the weather conditions that produce the minimum received signal on edge i. This allows for correct operation in the presence of weather fronts, for example where the path of a link is experiencing heavy rain, so that its transmitted power is increased, but the interference path is not experiencing rain, so that the interference is not diminished by rain.

In another preferred implementation, the interference level is calculated as the greater of:

that occurring when both signal and interference paths experience one extreme of weather conditions; and, that occurring when both signal and interference paths experience the other extreme of weather conditions.

This second approach is based on the premise that severely different conditions between signal and interference paths occur very rarely and can be included in the percentage of the time for which a link may not function correctly. This approach may be preferred to the previous one since it allows for substantially reduced margins between signal and interference and hence increases the traffic density that can be supported using a fixed allocation of transmission channels.

In the case where each antenna is associated with a separate radio receiver and transmitter unit, the interference is preferably calculated with reference only to the antenna positions corresponding to the relevant edges. As noted above, where multiple antennas are grouped with a common radio receiver and transmitter unit, this in practice is likely to give rise to interference through all the antennas thus associated, preferably diminished in the case of the antennas not allocated to the link by an isolation margin implemented in each node. In order to determine the interference effects allowing for grouped antennas in a static operating mesh, the worst case interference arising is determined by considering all combinations of:

any one of the grouped antennas at the source node for the interference; and, any one of the grouped antennas at the receiver node for the interference.

Preferably the case is also accommodated of an antenna within such groups that is not assigned to either of the edges and which is oriented in an arbitrary direction. As noted above this prevents interference effects arising specifically during antenna movements, such as may occur for example during an adaptation sequence. This case can be accommodated by considering all four combinations of two cases of antennas at the source node and the receiver node for the interference: the two cases are the antenna which is assigned to the edge, at its assigned orientation, plus another antenna in the group, oriented directly towards the other node but subject to the isolation margin.

Having determined:

the levels of relevant interference from each edge to each other edge; and, the total allowed interference into each edge;

this information can be used to modify the behaviour of the colouring process previously described.

When a colour is assigned to an edge, then in the case where multiple frequency channels are available, each assignment preferably includes a channel number. The channel number will in general affect the interference with other edges. Preferably the algorithm attempts first to allocate the lowest channel number in all colours and considers other channels only in the case described below.

When a colour is assigned to an edge [i], this colour becomes unavailable for all the edges [j] for which it would cause the total interference in that colour to exceed Allowed [j]. Note that it is not the same as using a colour at both end vertices of the edge, because the colour still remains available for other edges terminating at either end of edge [j] if they do not suffer interference from [i].

The preferred algorithm therefore applies the condition that there may not be excessive interference between a newly coloured edge and the existing coloured edges, in addition to requiring the same timeslot to be available at either end vertex of an edge. If this rules out all timeslots for the edge, considering only the lowest frequency channel, then consideration may be given to use of other frequency channels, preferring the lowest numbered useable channel.

Note that in the case where a source of and receiver of interference are located close to each other, transmissions in a specific timeslot will typically cause interference only in the same numbered timeslot. However, in the case of greater separations, interference may additionally or alternatively occur in following timeslots. This is preferably allowed for in determining the interference suffered. In this regard, it should be recalled that because the timeslot pattern repeats, Timeslot number 1 is the timeslot following Timeslot number numTimeSlots.

Some variations can be made to the above procedures, and these will now be discussed.

II.4. Constrained Colouring

Where a first mesh is currently being operated and it is proposed to change to a second mesh, for example as a step in a mesh adaptation, there will in general be a set of edges that occur in both meshes. Preferably a colouring can be calculated for the second mesh such that as many common colours from the first mesh are retained as possible. This is termed herein "constrained colouring".

In the following, a half-link is defined as the set of edges that are used to transmit from node N1 to node N2. A preferred method for constrained colouring divides the colouring process into three parts. Part 1 deals with each half-link that requires the same number of or more edges to be assigned in the second mesh than in the first mesh: the colourings for this half-link from the first mesh are simply copied to the second mesh; any additional edges required for these half-links will be coloured in Part 3. Part 2 deals with all other half-links that occur in both the first and the second meshes. As these were not dealt with in Part 1, they therefore have fewer edges to colour in the second mesh than in the first. For these half-links, the full colouring algorithm as above is run, but for each edge the only candidate colourings allowed are those which were used in the first mesh. Part 3 then deals with the additional edges for half-links which require additional edges to be coloured, plus all new half-links. In Part 3, the colouring process is run entirely unmodified. Note that backtracking can occur only in Part 3 but may alter colourings that were assigned in Parts 1 and 2.

Preferably, a time limit can optionally be set for a constrained colouring computation, for example the time limit being a small multiple of the time taken to carry out unconstrained colouring on the second mesh. This prevents the computation being continued in the case where substantial backtracking occurs, and where the resulting colouring for the second mesh is unlikely to be usefully more similar to the first mesh than for unconstrained colouring, due to the changes made during backtracking.

II.5. Concatenation

The colouring process can be enhanced to produce meshes that require the use of a reduced number of frequency channels in the case where the mesh radio equipment supports concatenation of timeslots, which will now be discussed.

Typically only p %, being less than 100%, of the duration of a timeslot is used for transmission of traffic. The remainder is reserved both for overhead transmissions used for example for radio link maintenance and also to allow a "guard band". One reason for employing a guard band in the context of the preferred mesh is to ensure that, taking account of the time of flight of a radio signal sent in a timeslot from node N1 to node N2, the signal has been completely received before N2 requires to begin communication with another node during the following timeslot.

If C consecutively numbered timeslots are concatenated, this means they are used on the same half-link and with the same additional colouring parameters, such as power level and frequency channel number. Therefore the transmitting node can transmit continuously through the C timeslots, thus utilising 100% of the first C-1 timeslots plus p % of the final timeslot in the concatenation. This can reduce the number of timeslots required to carry a given quantity of traffic. This is in turn will reduce the number of edges required at some vertices; in practice these are usually the most constrained vertices, which means that the colouring task can be potentially made to use fewer frequency channels.

In one preferred implementation, the total capacity required on all half-links should be such that this capacity can still be provided in the event that no concatenations are used, without requiring the number of edges available at any one vertex to be exceeded. In such a case, successful colouring of concatenations can assist in increasing spectral performance but it is not a precondition for achieving the specified capacities.

In order to take advantage of concatenations, the colouring algorithm is preferably aware of the total capacity required on each half-link, of the capacity obtained from 100% usage of a timeslot, and also of the value of p. It should be noted that the value of p in general depends on the physical length of the half-link.

Given the above information, it is possible to compute all the optimum concatenations for a mesh. On any half-link, a concatenation of C timeslots is beneficial if its use on the half link in place of unconcatenated timeslots would allow at least one timeslot less to be used on the half-link to provide the total required capacity. For a half-link for which at least one beneficial concatenation exists and for which up to D timeslots can be dropped by use of one such, the best single concatenation is the shortest beneficial concatenation, being of length B timeslots, which allows D timeslots to be dropped. If the best single concatenation cannot be split into two or more smaller concatenations that use a total of B timeslots and allow a total of D timeslots to be dropped, then the best single concatenation is the optimum concatenation for that half-link. Otherwise the optimum concatenations for the half-link are such two or more smaller concatenations. Preferably, where more than one set of such smaller concatenations exists, the optimum concatenations are that set with the smallest maximum length of any of the smaller concatenations.

Given that optimum concatenations exist for a subset of the half-links in some mesh, the colouring algorithm can be modified to incorporate them. Preferably, all such concatenations are coloured completely at the start of the colouring process, instead of starting at a vertex with the maximum number of edges. The optimum concatenations are preferably coloured in descending order of C. For colouring of concatenations, the colouring algorithm looks for a consecutive block of C timeslots that are usable with a single value of power settings/frequency channel number. In each case, if none such is available, the full number of unconcatenated edges must be coloured instead. After attempting colouring of the concatenations, the process of colouring the remaining single edges then proceeds as previously described.

Where constrained colouring and concatenations are both used, then preferably in Parts 1 and 2 of the constrained colouring method discussed above all unchanged optimum concatenations from the first mesh are copied as a part of the constrained colouring process described above. Then Part 3 of the constrained colouring method discussed above begins by attempting to colour first the remaining concatenations and then all remaining single edges.

II.6. Coexistence with Other Radio Systems

There may be at least one "alien" radio system (being a radio system that is not part of the mesh), comprising a transmitter and/or a receiver, operating at a frequency close to or the same as one or more frequency channels used by the mesh, such that one or more edges of the mesh, if inappropriately coloured, will suffer interference from or cause interference to such alien radio system. Given some information about the characteristics of such alien radio system, additional steps are preferably added to the colouring process such that a colouring is produced in which such interference does not occur.

Examples of interference to and from a mesh will now be given.

II.6.1. Interference to a Mesh

There may be a radio system operating in the same geographic region as a mesh which uses frequency channels close to those used in the mesh. This may for example be a cellular radio system. Information on the location, frequency use, transmission power and antenna profiles of the base stations in such a cellular system will generally be obtainable. Such base stations will emit high power signals which may potentially cause interference to one or more edges of the mesh.

More generally, there may be an alien transmitter of interference, whether in the same geographic region as a mesh, close to it or remote from it, transmitting at frequencies close to or the same as one or more of those being used in the mesh, such that one or more edges in the mesh may potentially receive interference from such alien transmitter. An example of a remote transmitter that may cause interference is a satellite radio transmitter. The existence of such a transmitter, and its location and other characteristics as above, may be notified to the operator of a mesh system and thus constitute information that can be used during the colouring process.

If information about an alien transmitter is not available or for safety in any event, the mesh radio devices at the nodes may assign some time allocation to detecting significant levels of interference from alien transmitters. Information from such measured levels can then be used during the colouring process. For example, in U.S. Ser. No. 60/306,446 and U.S. Ser. No. 09/971,655 (US 2002/0042274 A1) it is described that timeslots might be reserved for interference measurements. In the present context, some of these reserved timeslots may be allocated such that no mesh devices transmit during these timeslots. In such timeslots, the mesh devices can be arranged to measure total intefference due to alien devices, carrying out such measurements for one or more frequency channels and one or more antenna positions.

In some cases, the exact location of an alien transmitter may not be known, or it may vary over time, and thus it may be desirable to produce a colouring that tolerates transmissions from anywhere in some geographic region up to some interference power. For example, there may be a radio network in a nearby region whose topology varies over time and whose maximum transmitting power is known.

In all of these cases, the total interference from alien transmitters may be calculated for each combination of an edge of the mesh and frequency channel available for use in the mesh. Where interference has been measured, its value can be included directly in the calculation of the total interference. Where the interference is predicted to come from a particular transmitter location or region, its worst case value can be calculated taking account of the antenna position, antenna profile and channel rejection of the mesh device receiving the interference.

As a part of the preferred colouring process described above (see section II.3 above), a transmit signal power level for each edge in the mesh will have been chosen. Since in the preferred embodiment the transmit signal level for each edge has been determined, the threshold level of interference on each edge, above which the edge will not operate correctly, can also be determined. If an edge/channel combination shows interference from alien systems above this level, that edge/channel combination can be marked as not useable. Otherwise, the alien interference can be combined with mesh interference during the colouring process.

In general, the alien transmitter will not use a timeslot pattern that is the same as that used in the mesh. In such cases, the calculated interference is preferably regarded as applying to all timeslots if used on a particular frequency channel at a specific edge, rather than more specifically to individual edge/timeslot/frequency combinations.

II.6.2. Interference from a Mesh

Examples of interference from a mesh include the case of a radio system operating in the same geographic region as a mesh which uses frequency channels close to those used in the mesh. This may for example be a cellular radio system. In such a case, information on the location, frequency use, interference susceptibility and antenna profiles of the base stations in such a cellular system will generally be obtainable. One or more edges of the mesh may potentially cause interference to such a base station.

More generally, there may be an alien radio receiver, which may be in the same geographic region as a mesh, close to it or remote from it, receiving at frequencies close to or the same as one or more of those being used in the mesh, such that one or more edges in the mesh may potentially cause interference to such alien receiver. The existence of such a receiver, and its location and other characteristics as above, may be notified to the operator of a mesh system and thus be information that can be used during the colouring process. An example of such a receiver is a radio telescope which detects signals on frequencies the same as or close to one or more of those used in the mesh.

In some cases, the exact location of an alien receiver may not be known, or it may vary over time, and thus it may be desirable to produce a colouring that generates no more than a certain interference level in a defined geographic region. For example, there may be a radio network of known characteristics in a nearby region, the position of whose individual radio systems is not known.

As mentioned above, as a part of the preferred colouring process described above (see section II.3 above), a transmit signal power level for each edge in the mesh will have been chosen. Given such signal levels, the worst case interference from each edge to each alien receiver position or region can be calculated for transmissions on each frequency channel used by the mesh. Such worst case interference calculation preferably takes account of the orientation of the mesh transmitter compared to the alien receiver and the antenna profile of the mesh transmitter. Where suitable information is available, it also preferably takes account of the orientation of the alien receiver and its antenna profile. As a result of this process, each combination of edge and frequency channel is marked to indicate whether the channel may be used on that edge: a particular combination of edge and frequency channel may be used only if the level of interference to all alien receivers is below the level that is acceptable.

In general, the alien receiver will not use a timeslot pattern that is the same as that used in the mesh. In such cases, the calculated interference is preferably regarded as applying to all timeslots if used on a particular frequency channel for a specific edge, rather than more specifically to individual timeslot/frequency combinations.

II.6.3. Accounting for Alien Interference During Colour Choice

As a result of carrying out the steps described above, each edge/channel combination can be marked to indicate:

if the edge/channel combination is unacceptable, on considerations of interference between the mesh and alien systems;

if not, the level of interference arising at the edge/channel combination due to alien transmitters.

The preferred colouring process described above can take these factors into account, in the same way as it takes into account interference from other edges of the mesh, each time a colour is assigned for use on an edge. In this regard, reference is again made to section II.3 above.

Provided that the number of unacceptable edge/channel combinations is a small proportion of the total combinations, then a colouring that accommodates such coexistence requirements can typically be achieved without alteration to the number of frequency channels required to operate the mesh.

An analysis of a typical cellular system co-located with a typical mesh shows that the proportion of mesh transmitters that can potentially provide an unacceptable level of interference to a base station located in the same operating region is no more than 2.5%, and this can only for one specific channel out of those available to the mesh transmitters. This FIG. also takes no account of the orientations of the mesh edges linked to these mesh transmitters. Given that the preferred mesh system uses highly directional antennas, the mesh transmitter will be a potential interferer to a base station only for a specific subset of the possible edge orientations at the mesh transmitter: this further reduces the number of unacceptable edge/channel combinations. A similar argument applies to the proportion of edges that can potentially receive interference from a base station.

In practice, a "safety zone" can be defined around a cellular base station such that it is only mesh transmitters within the safety zone that may (but which do not necessarily) cause interference to the base station, whereas any mesh transmitter outside the safety zone will not cause interference to the base station (because attenuation of signals transmitted by the mesh transmitters causes any interference to drop below an acceptable level). In a typical example, the safety zone around a base station may have a radius in the range 60 to 200 m or so. In the preferred colouring process which takes into account interference to an alien receiver, it may be sufficient to take into consideration transmissions only from those mesh transmitters that lie within the safety zone. This may assist in speeding up the calculation process but is not essential to the more general method described above.

The following alteration to the colouring procedure is preferably used to avoid or minimise the requirement for additional frequency channels in a case where coexistence constraints affect a significant proportion of edge/channel combinations. The frequency channels are ordered in descending order of the number of edges for which each channel is not available. When a frequency is to be assigned to any edge, the channels are considered as candidates according to this order until a channel is found that is acceptable on grounds of interference levels (both within the mesh and with respect to alien systems). The effect of this order of consideration is to make most use of frequency channels that have the greatest alien interference constraints, thus giving the best choice when an edge with severe alien interference constraints must be accommodated.

It is to be noted that interference to and from an alien radio system can effectively be avoided by appropriate colouring of the mesh network without requiring any specific coordination between the operators of the mesh network and the alien radio system. There is also typically no appreciable effect on the spectral efficiency of the mesh network.

II.7. Other Variations

When assigning a colour for a new edge, and where there are multiple choices of timeslot for this edge, strategies for choosing between them include:

a) prefer the least-used timeslot (by number of edges assigned so far), or b) prefer the most-used timeslot (by number of edges assigned so far), or c) choosing the timeslot which reduces the options for the smallest number of edges yet to be coloured.

Note that the choice of timeslot will not alter the number of other edges affected by interference, except in cases where cumulative limits are exceeded. Here the timeslot choice is made on topological grounds only. For example, (c) aims to introduce as little as possible new topological constraint.

Option (c) seeks to maximise the number of timeslots from which a selection can potentially be made, throughout the colouring process. Option (a) aims to utilise timeslots as evenly as possible, in order to reduce the probability that a dead-end position is reached in all of them due to interference combinations. Option (b) operates on the basis that by leaving some timeslots as little used as possible, these can then be used to resolve the most restrictive interference constraints. Selection as described in II.3 above of the lowest numbered useable channel when no timeslot choices are available using the lowest channel number operates on a similar basis to option (b), since it leaves the highest numbered channels as little used as possible. The modified channel order mentioned in II.6.3 above also works on a similar basis.

In some meshes, there will be nodes that are sited very close to each other. Examples are at a TNCP 4 where multiple nodes may be co-located to reduce the cost of access to a backhaul network. In such cases, depending on the sizes of antenna off-centre rejection and the demodulation margin, it may be very unlikely that:

a timeslot used for transmission at one of these nodes can be used for reception at another; and that:

the same timeslot and channel combination can be used for reception at two such nodes.

Since these may be very tight restrictions on the colouring process, then in line with the general approach above, they are preferably addressed first, to avoid substantial backtracking. In one preferred implementation therefore, whenever an edge on one link to or from such a node is coloured, an attempt is made to use the same timeslot number to colour an edge on each other closely located node.

Figures 2, 3:
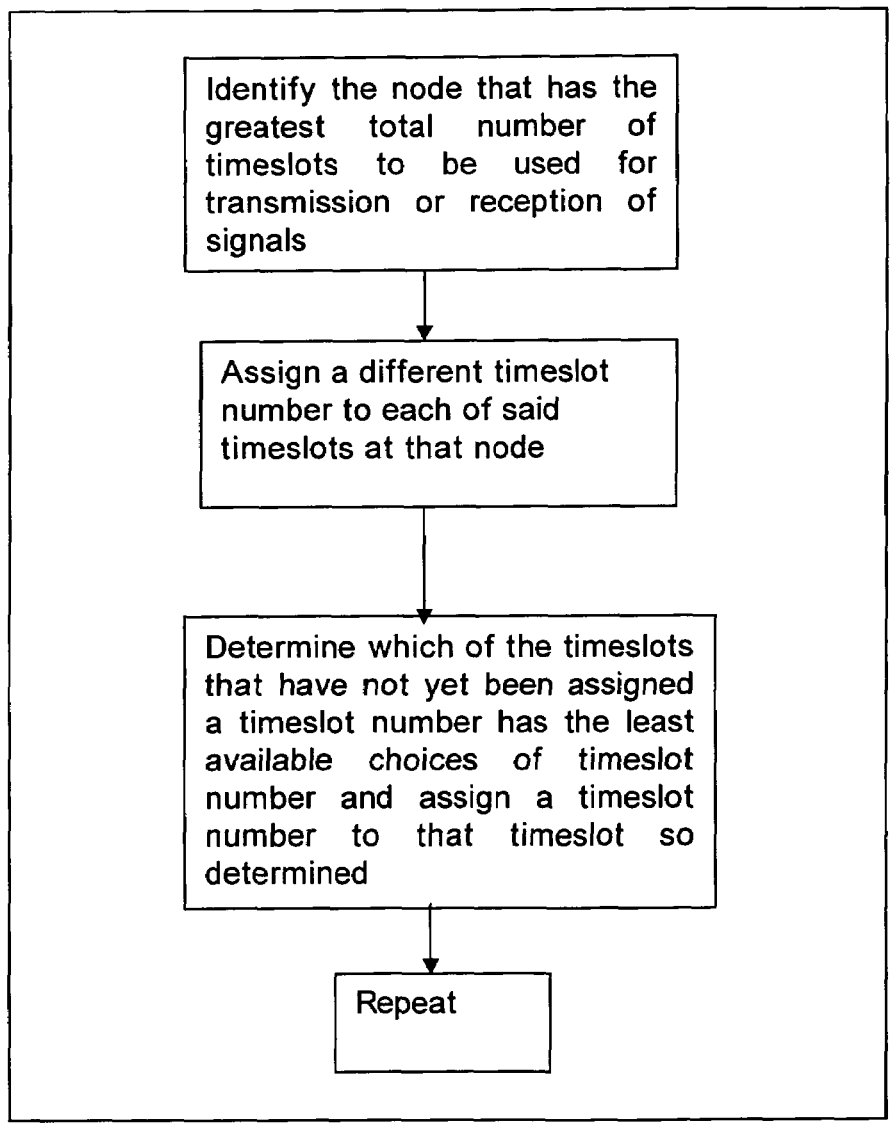
FIGS. 2 to 4 show schematically the main steps of examples of embodiments of the present invention.

Referring to FIG. 2, in one example of an embodiment of the present invention, timeslot numbers are assigned to each timeslot in sequence in ascending order of the number of available choices of timeslot number at each timeslot.

Referring to FIG. 3, in one example of an embodiment of the present invention, first the node that has the greatest total number of timeslots to be used for transmission or reception of signals is identified. Then, for that node, a different timeslot number is assigned to each of said timeslots at that node. Then it is determined which of the timeslots that have not yet been assigned a timeslot number has the least available choices of timeslot number, and a timeslot number is assigned to that timeslot. This step is repeated until all timeslots have been assigned a timeslot number.

Figure 4:
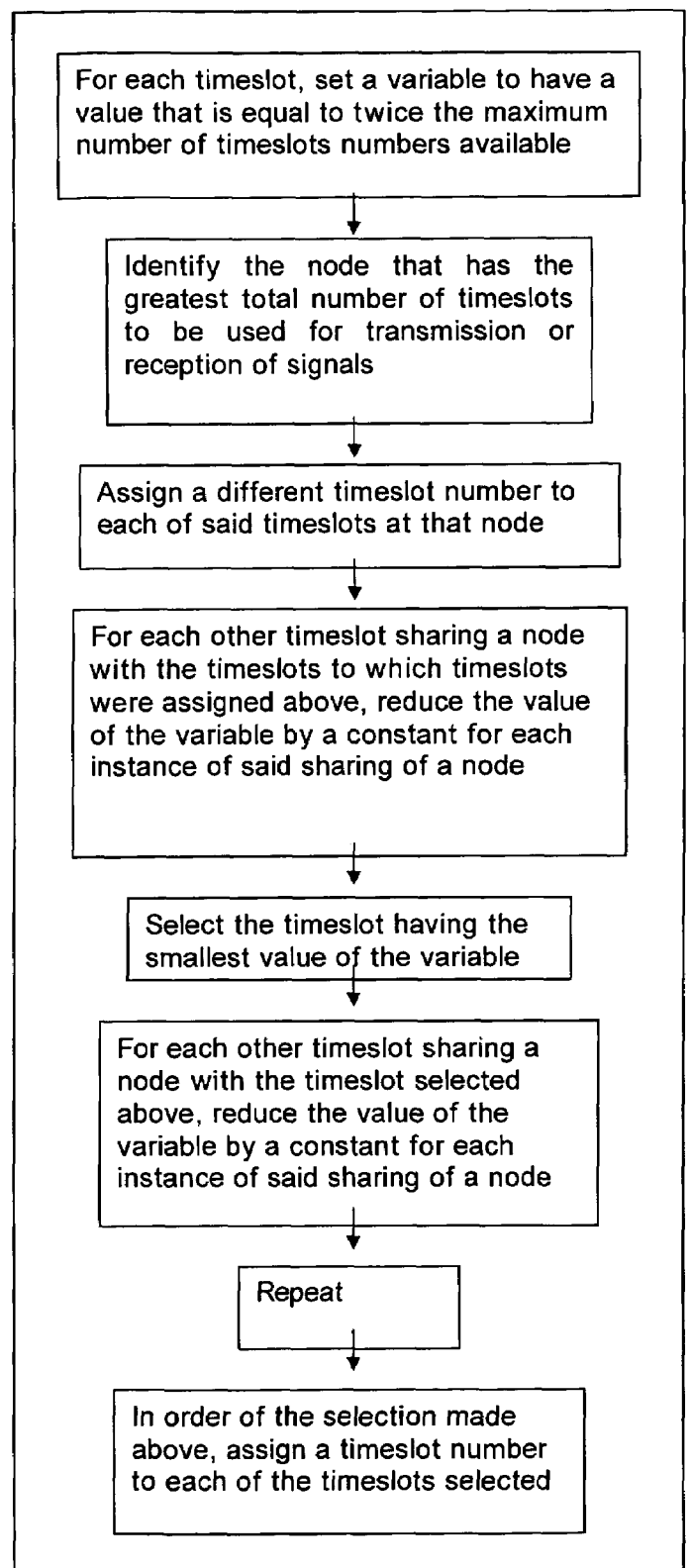

Referring to FIG. 4, in one example of an embodiment of the present invention, first, for each timeslot, a variable is set to have a value that is equal to twice the maximum number of timeslots numbers available. The node that has the greatest total number of timeslots to be used for transmission or reception of signals is identified. A different timeslot number is assigned to each of said timeslots at that node. Then, for each other timeslot sharing a node with the timeslots to which timeslots were assigned above, the value of the variable is reduced by a constant for each instance of said sharing of a node. Next, the timeslot having the smallest value of the variable is selected. For each other timeslot sharing a node with the timeslot so selected, the value of the variable is reduced by a constant for each instance of said sharing of a node. These steps are repeated until all timeslots have been selected. Then, in order of the selection made above, a timeslot number is assigned to each of the selected timeslots.

Although the embodiments of the invention described herein with reference to the drawings principally comprise computer processes performed in computer apparatus and computer apparatus per se, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier be any entity or device capable of carrying the program. For example, the carrier may comprise a storage medium, such as a ROM, for example a CD ROM or a semiconductor ROM, or a magnetic recording medium, for example a floppy disk or hard disk.

Embodiments of the present invention have been described with particular reference to examples illustrated schematically in the drawings. However, it will be appreciated that variations and modifications may be made to the examples described within the scope of the present invention.

The invention claimed is:

1. A method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

assigning timeslot numbers to each timeslot, wherein timeslots having fewer unassigned timeslot numbers are assigned timeslot numbers before timeslots having a greater number of unassigned timeslot numbers and at least two consecutive timeslots are allocated on at least one link for transmission such that user traffic is in use transmitted continuously over more than one timeslot on said at least one link and wherein a timeslot number is assigned to said at least one link before timeslot numbers are assigned to any link not having two consecutive timeslots allocated for transmission.

2. A method according to claim 1, wherein the timeslot number that is assigned to a timeslot is the first timeslot number which is free at the nodes at both ends of the timeslot.

3. A method according to claim 1, wherein a timeslot number is determined to be available taking into account interference that might arise in use on one link as a result of transmission on another link.

4. A method according to claim 1, comprising the step of assigning a frequency channel to each timeslot at which wireless transmission takes place during the timeslot.

5. A method according to claim 4, wherein the frequency channel assigned to the or each timeslot on at least one link is selected taking into account interference that might in use be caused to or arise from a transmission/reception device that is not a part of said network of nodes during transmission over said at least one link.

6. A method according to claim 5, wherein the available frequency channels are ordered in descending order of the number of links from one node to another node for which interference to or from a transmission/reception device that is not a part of said network of nodes during transmissions would be unacceptable, and wherein the frequency channel assigned to the or each timeslot on said at least one link is the first acceptable frequency channel in said order.

7. A method according to claim 5, wherein the determination of whether or not a frequency channel is acceptable takes into account interference that might in use be caused to or arise from a transmission/reception device that is not a part of said network of nodes during transmissions at the frequency channel.

8. A method according to claim 1, wherein all timeslots have the same duration.

9. A method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

(a) identifying the node that has the greatest total number of timeslots to be used for transmission or reception of signals;

(b) for the node identified in step (a), assigning a different timeslot number to each of said timeslots at that node;

(c) of the timeslots that have not yet been assigned a timeslot number, determining which timeslot has the fewest unassigned timeslots number and assigning a timeslot number to that timeslot so determined; and, (d) repeating step (c) until all timeslots have been assigned a timeslot number.

10. A method according to claim 9, wherein the timeslot number that is assigned to a timeslot is the first timeslot number which is free at the nodes at both ends of the timeslot.

11. A method according to claim 9, wherein a timeslot number is determined to be available taking into account interference that might arise in use on one link as a result of transmission on another link.

12. A method according to claim 9, comprising the step of assigning a frequency channel to each timeslot at which wireless transmission takes place during the timeslot.

13. A method according to claim 12, wherein the frequency channel assigned to the or each timeslot on at least one link is selected taking into account interference that might in use be caused to or arise from a transmission/reception device that is not a part of said network of nodes during transmission over said at least one link.

14. A method according to claim 13, wherein the available frequency channels are ordered in descending order of the number of links from one node to another node for which interference to or from a transmission/reception device that is not a part of said network of nodes during transmissions would be unacceptable, and wherein the frequency channel assigned to the or each timeslot on said at least one link is the first acceptable frequency channel in said order.

15. A method according to claim 13, wherein the determination of whether or not a frequency channel is acceptable takes into account interference that might in use be caused to or arise from a transmission/reception device that is not a part of said network of nodes during transmissions at the frequency channel.

16. A method according to claim 9, wherein at least two consecutive timeslots are allocated on at least one link for transmission such that user traffic is in use transmitted continuously over more than one timeslot on said at least one link.

17. A method according to claim 16, wherein a timeslot number is assigned to said at least one link before timeslot numbers are assigned to any link not having two consecutive timeslots allocated for transmission.

18. A method according to claim 16, wherein all timeslots have the same duration.

19. A computer-executable program comprising computer-executable program instructions stored on a computer-readable storage medium to cause a computer to assign timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, wherein assigning timeslot numbers comprises:

(a) identifying the node that has the greatest total number of timeslots to be used for transmission or reception of signals;

(b) for the node identified in step (a), assigning a different timeslot number to each of said timeslots at that node;

(c) of the timeslots that have not yet been assigned a timeslot number, determining which timeslot has the fewest unassigned timeslot numbers and assigning a timeslot number to that timeslot so determined; and, (d) repeating step (c) until all timeslots have been assigned a timeslot number.

20. A method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

(a) for each timeslot, setting a variable to have a value that is equal to twice the maximum number of timeslots numbers available;

(b) identifying the node that has the greatest total number of timeslots to be used for transmission or reception of signals;

(c) for the node identified in step (b), assigning a different timeslot number to each of said timeslots at that node;

(d) for each other timeslot sharing a node with the timeslots to which timeslots were assigned in step (c), reducing the value of the variable by a constant for each instance of said sharing of a node;

(e) selecting the timeslot having the smallest value of the variable;

(f) for each other timeslot sharing a node with the timeslot selected in step (e), reducing the value of the variable by a constant for each instance of said sharing of a node;

(g) repeating steps (e) and (f) until all timeslots have been selected; and, (h) in order of the selection made in steps (e) to (g), assigning a timeslot number to each of the timeslots selected in steps (e) to (g).

21. A method according to claim 20, wherein the timeslot number that is assigned to a timeslot is the first timeslot number that is free at the nodes at both ends of the timeslot.

22. A method according to claim 20, wherein a timeslot number is determined to be available taking into account interference that might arise in use on one link as a result of transmission on another link.

23. A method according to claim 20, comprising the step of assigning a frequency channel to each timeslot at which wireless transmission takes place during the timeslot.

24. A method according to claim 23, wherein the frequency channel assigned to the or each timeslot on at least one link is selected taking into account interference that might in use be caused to or arise from a transmission/reception device that is not a part of said network of nodes during transmission over said at least one link.

25. A method according to claim 24, wherein the available frequency channels are ordered in descending order of the number of links from one node to another node for which interference to or from a transmission/reception device that is not a part of said network of nodes during transmissions would be unacceptable, and wherein the frequency channel assigned to the or each timeslot on said at least one link is the first acceptable frequency channel in said order.

26. A method according to claim 24, wherein the determination of whether or not a frequency channel is acceptable takes into account interference that might in use be caused to or arise from a transmission/reception device that is not a part of said network of nodes during transmissions at the frequency channel.

27. A method according to claim 20, wherein at least two consecutive timeslots are allocated on at least one link for transmission such that user traffic is in use transmitted continuously over more than one timeslot on said at least one link.

28. A method according to claim 27, wherein a timeslot number is assigned to said at least one link before timeslot numbers are assigned to any link not having two consecutive timeslots allocated for transmission.

29. A method according to claim 27, wherein all timeslots have the same duration.

30. A computer-executable program comprising computer-executable program instructions stored on a computer-readable storage medium to cause a computer to assign timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking each during a timeslot, wherein assigning timeslots comprises:

(a) for each timeslot, setting a variable to have a value that is equal to twice the maximum number of timeslots numbers available;

(b) identifying the node that has the greatest total number of timeslots to be used for transmission or reception of signals;

(c) for the node identified in step (b), assigning a different timeslot number to each of said timeslots at that node;

(d) for each other timeslot sharing a node with the timeslots to which timeslots were assigned in step (c), reducing the value of the variable by a constant for each instance of said sharing of a node;

(e) selecting the timeslot having the smallest value of the variable;

(f) for each other timeslot sharing a node with the timeslot selected in step (c), reducing the value of the variable by a constant for each instance of said sharing of a nodes;

(g) repeating steps (c) and (f) until all timeslots have been selected; and, (h) in order of the selection made in steps (e) to (g), assigning a timeslot number to each of the timeslots selected in steps (e) to (g).

* * * * *